US012724442B2

(12) United States Patent
Chang et al.

(10) Patent No.: US 12,724,442 B2
(45) Date of Patent: Sep. 1, 2026

(54) VOLTAGE REGULATION DEVICE WITH DUAL-LOOP DESIGN

(71) Applicant: Himax Imaging Limited, Tainan City (TW)

(72) Inventors: Ya-Sen Chang, Tainan City (TW); Ghia-Ming Hong, Tainan City (TW); Puo-Tsang Huang, Tainan City (TW); Zheng-Zhi Huang, Tainan City (TW); Chen-Cheng-Hung Hung, Tainan City (TW)

(73) Assignee: Himax Imaging Limited, Tainan City (TW)

( * ) Notice: Subject to any disclaimer, the term of this patent is extended or adjusted under 35 U.S.C. 154(b) by 177 days.

(21) Appl. No.: 18/767,996

(22) Filed: Jul. 10, 2024

(65) Prior Publication Data

US 2026/0016846 A1 Jan. 15, 2026

(51) Int. Cl.
*G05F 1/59* (2006.01)
*G05F 1/575* (2006.01)
*G05F 3/26* (2006.01)

(52) U.S. Cl.
CPC ................ *G05F 1/59* (2013.01); *G05F 1/575* (2013.01); *G05F 3/262* (2013.01)

(58) Field of Classification Search
CPC . G05F 1/56; G05F 1/563; G05F 1/565; G05F 1/575; G05F 1/59; G05F 3/26–267
See application file for complete search history.

(56) References Cited

U.S. PATENT DOCUMENTS

| | | | | |
|---|---|---|---|---|
| 2019/0079552 | A1* | 3/2019 | Yasusaka | G05F 1/461 |
| 2019/0302819 | A1* | 10/2019 | Hu | G05F 1/575 |
| 2019/0384337 | A1* | 12/2019 | Lu | G05F 1/575 |
| 2024/0370046 | A1* | 11/2024 | Inoue | G05F 1/575 |
| 2025/0165018 | A1* | 5/2025 | Ahmed | G05F 1/468 |

* cited by examiner

*Primary Examiner* — Fred E Finch, III
(74) *Attorney, Agent, or Firm* — Winston Hsu

(57) ABSTRACT

A voltage regulation device includes: a first low-dropout (LDO) regulator, a second LDO regulator and a signal coupling circuit. The first LDO regulator is configured to receive an input voltage of the voltage regulation device and accordingly generate and stabilize an output voltage of the voltage regulation device. The second LDO regulator is coupled in parallel with the first LDO regulator, and configured to provide supplementary regulation to further stabilize the output voltage. The signal coupling circuit is coupled between the first LDO regulator and the second LDO regulator, configured to apply a voltage provided by second LDO regulator to the first LDO regulator, thereby modulating an operation of the first LDO regulator.

8 Claims, 2 Drawing Sheets

VOLTAGE REGULATION DEVICE WITH DUAL-LOOP DESIGN

BACKGROUND OF THE INVENTION

1. Field of the Invention

The present invention relates to voltage regulators, and more particular, to a capless voltage regulation device with dual-loop design.

2. Description of the Prior Art

In the realm of high-speed electronic circuits, voltage regulators, such as low-dropout regulators (LDOs) play a crucial role in power management and signal integrity. As the demand for faster data transmission and processing continues to escalate, particularly in applications such as mobile devices, automotive systems, and high-performance computing, the performance requirements for LDOs have become increasingly stringent. High-speed interfaces, such as Mobile Industry Processor Interface (MIPI), impose strict timing constraints on voltage stabilization. These standards typically require signal lines to settle within nanoseconds after a transition, placing significant pressure on power supply design.

Conventional LDO designs often struggle to meet these demanding specifications. The primary challenges include: 1) transient response; an LDO may exhibit significant voltage undershoot or overshoot due to rapid load current changes, which are common in high-speed digital circuits; 2) settle time; the time required for an LDO to stabilize an output voltage after a load transient may exceed the allowable limits required by high-speed interfaces; 3) output capacitor limitation; high-speed applications often restrict of the large output capacitors, which use traditionally help in stabilizing output of an LDO, due to space constraints and the need for fast response times. These challenges necessitate innovative approaches to LDO design that can improve transient response and settle time without compromising other performance parameters.

SUMMARY OF THE INVENTION

With this in mind, it is one object of the present invention to introduce a capless LDO architecture that substantially improves transient response and minimizes settle time. The capless LDO architecture of the present invention employs a dual-loop LDO regulator configuration, leveraging the complementary advantages of two different differential amplifier implementations. In such architecture, a primary LDO regulator incorporates a large-geometry differential amplifier, which ensures robust current driving capability. In addition, a secondary LDO regulator incorporates a small-geometry differential amplifier, which ensures rapid response to load transient and faster settle time. This architecture enables the LDO to meet the stringent requirements of high-speed applications without the need for external output capacitors, thus achieving a capless design.

According to one embodiment, a voltage regulation device includes: a first LDO regulator, a second LDO regulator and a signal coupling circuit. The first LDO regulator is configured to receive an input voltage of the voltage regulation device and accordingly generate and stabilize an output voltage of the voltage regulation device. The second LDO regulator is coupled in parallel with the first LDO regulator, and configured to provide supplementary regulation to further stabilize the output voltage. The signal coupling circuit is coupled between the first LDO regulator and the second LDO regulator, configured to apply a voltage provided by second LDO regulator to the first LDO regulator, thereby modulating an operation of the first LDO regulator.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are described to provide a thorough understanding of embodiments of the invention. One skilled in the relevant art will recognize, however, that the invention can be practice without one or more of the specific details, or with other methods, components, materials, etc. In other instances, well-known structures, materials or operations are not shown or described in details but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Directional terminology such as "top", "bottom", "under" is used with reference to the orientation of the figure(s) being described.

Figure 1:
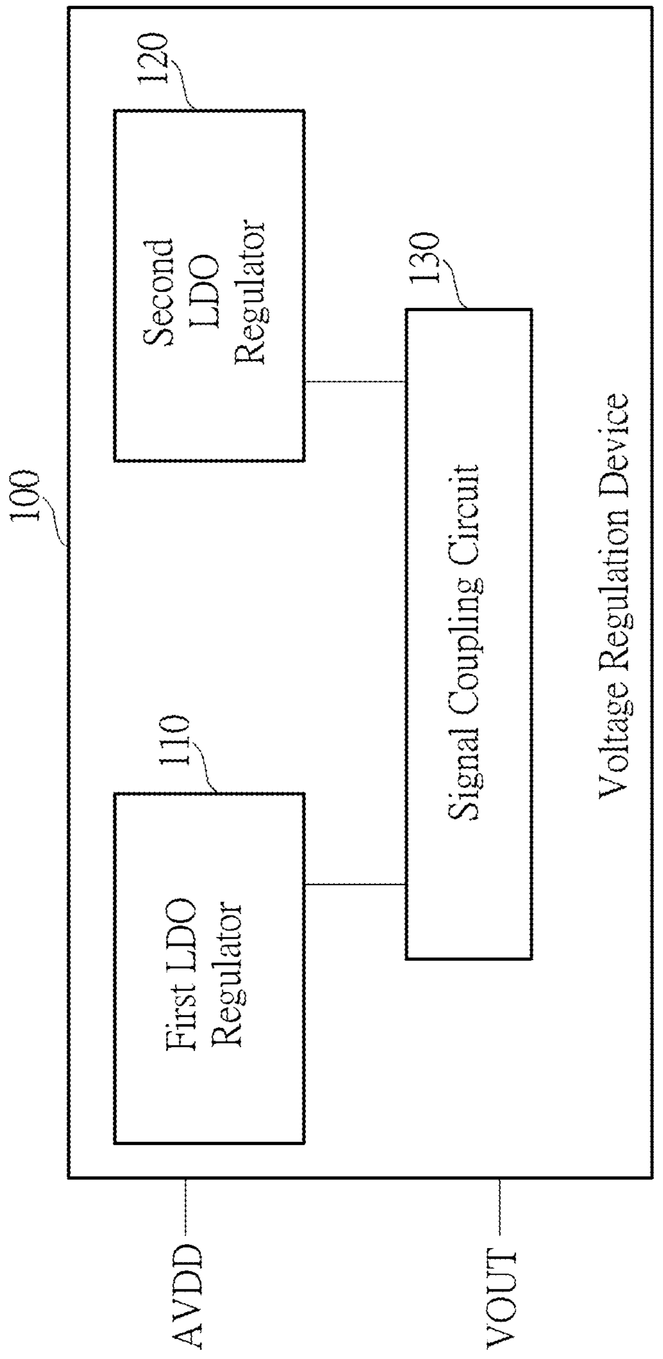
FIG. 1 illustrates a simplified block diagram of a voltage regulation device according to one embodiment of the present invention.

Please refer to FIG. 1, which illustrates a simplified block diagram of a voltage regulation device according to one embodiment of the present invention. As illustrated, a voltage regulation device 100 comprises a first low-dropout (LDO) regulator 110, a second LDO regulator 120 and a signal coupling circuit 130. The voltage regulation device 100 is configured to provide an output voltage VOUT in response to an input voltage AVDD. Specifically, the first LDO regulator 110 is configured to receive the input voltage AVDD of the voltage regulation device 100 and accordingly regulate its output thereby to generate the stable output voltage VOUT. The second LDO regulator 120 is coupled in parallel with the first LDO regulator 110 and is configured to provide supplementary regulation to further stabilize the output voltage VOUT, thereby improving the overall transient response of the voltage regulation device 100. The signal coupling circuit 130 is coupled between the first LDO regulator 110 and the second LDO regulator 120 and configured to apply a voltage provided by second LDO regulator 120 to the first LDO regulator 110, thereby modulating the operation of the first LDO regulator 110.

Figure 2:
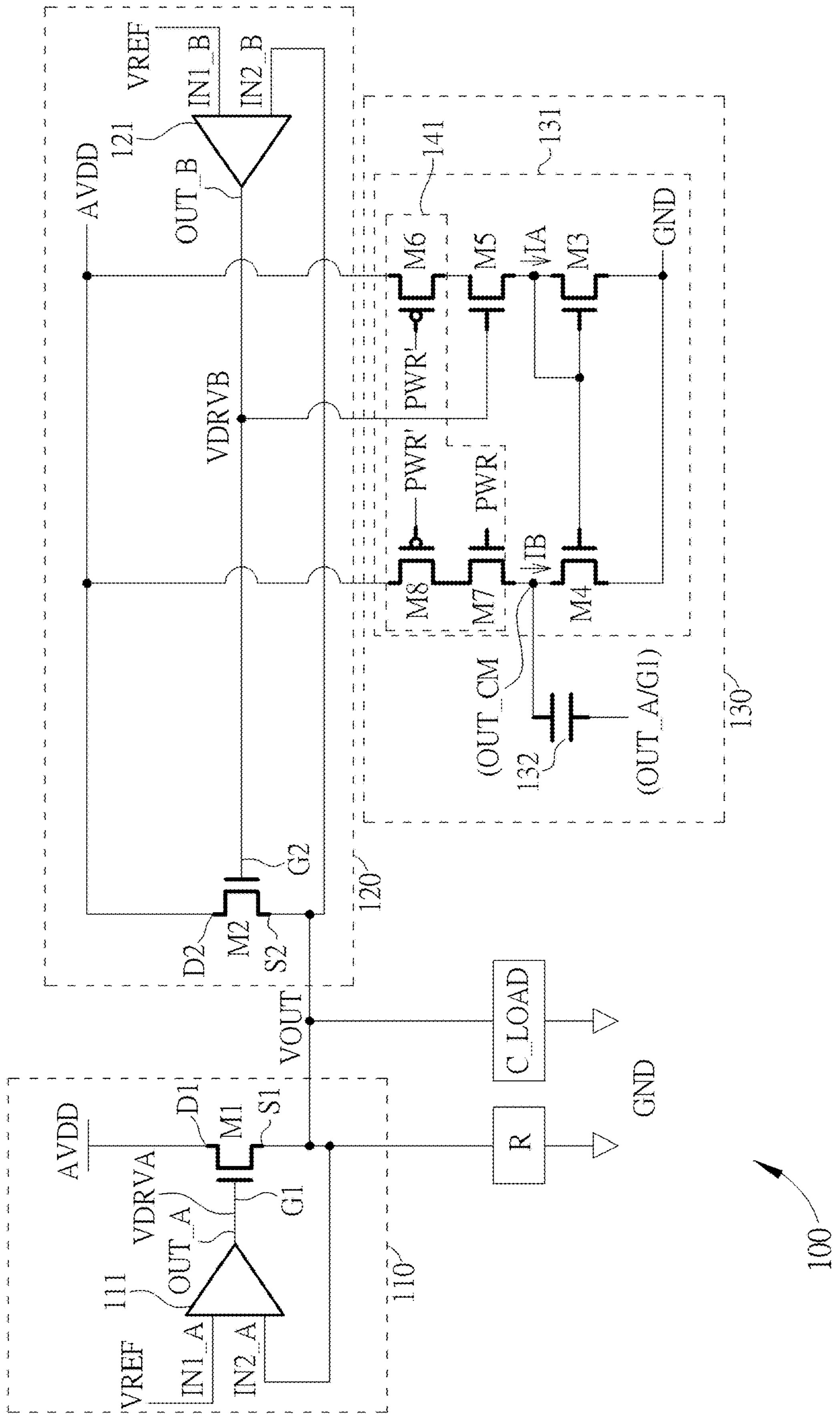
FIG. 2 illustrates a circuit diagram of a voltage regulation device according to one embodiment of the present invention.

Please refer to FIG. 2, which illustrates a detailed circuit diagram of a voltage regulation device according to one embodiment of the present invention. In this embodiment, the first LDO regulator 110 comprises: a first differential amplifier 111 and a first pass transistor M1. The first differential amplifier 111, which may be implemented as an operational amplifier, is configured to drive the first pass transistor M1 based on a difference between the output voltage VOUT of the voltage regulation device 100 and a reference voltage VREF, wherein the reference voltage VREF can be provided by an internal or external bandgap voltage reference or other types of reference voltage generators. The first pass transistor M1 is driven by the first differential amplifier 111 and coupled between the input voltage AVDD and the output voltage VOUT, which functions as a variable resistor in the first LDO regulator 110, dynamically adjusting its channel resistance to regulate the output voltage VOUT. The first pass transistor M1 is controlled by a first driving signal VDRVA generated by the first differential amplifier 111, and accordingly modulates a current flow from the input (i.e., the terminal coupled to the input voltage AVDD) to the output (i.e., the terminal coupled to the output voltage VOUT) of the voltage regulation device 100, thereby maintaining the stable output voltage VOUT despite variations in the input voltage AVDD or fluctuations in a load current drawn by a load C LOAD.

More specifically, the first differential amplifier 111 has a first input terminal IN1_A, a second input terminal IN2_A and the output terminal OUT_A. The first pass transistor M1 has a control terminal G1, a first terminal D1 and a second terminal S1. The first input terminal IN1_A of the first differential amplifier 111 is coupled to the reference voltage VREF. The second input terminal IN2_A of the first differential amplifier 111 is coupled to the second terminal S1 of first pass transistor M1 and the output voltage VOUT, as well as coupled to the ground GND through a resistor R. The output terminal OUT_A of the first differential amplifier 111 is coupled to the control terminal G1 of the first pass transistor M1, and the first terminal D1 of the first pass transistor M1 is coupled to the input voltage AVDD.

The second LDO regulator 120 comprises: a second differential amplifier d a second pass transistor M2. The second differential amplifier 121, which may be implemented as an operational amplifier, is configured to drive the second pass transistor M2 based on the difference between the output voltage VOUT of the voltage regulation device 100 and the reference voltage VREF. The second pass transistor M2 is driven by the second differential amplifier 121 and coupled between the input voltage AVDD and the output voltage VOUT, which functions as a variable resistor in the second LDO regulator 120, dynamically adjusting its channel resistance to regulate the output voltage VOUT. The second pass transistor M2 is controlled by a second driving signal VDRVB generated by the second differential amplifier 121, and accordingly modulates the current flow from the input to the output of the voltage regulation device 100, thereby maintaining the stable output voltage VOUT despite variations in the input voltage AVDD or fluctuations in the load current drawn by the load C LOAD.

More specifically, the second differential amplifier 121 has a first input terminal IN1_B, a second input terminal IN2_B and an output terminal OUT_B. The second pass transistor M2 has a control terminal G2, a first terminal D2 and a second terminal S2. The first input terminal IN1_B of the second differential amplifier 121 is coupled to the reference voltage VREF. The second input terminal IN2_B of the second differential amplifier 121 is coupled to the second terminal S2 of second pass transistor M2 and the output voltage VOUT, as well as coupled to the ground GND through the resistor R. The output terminal OUT_B of the second differential amplifier 121 is coupled to the control terminal G2 of the second pass transistor M2, and the first terminal D2 of the second pass transistor M2 is coupled to the input voltage VDD.

In this embodiment, a size of the second differential amplifier 121 is smaller than that of the first differential amplifier 111. That is, geometric parameters (e.g., channel length, channel width and/or W/L ratio) of one or more transistors included in the second differential amplifier M2 are designed to be smaller than those of corresponding transistors included in the first differential amplifier 111. For example, the second differential amplifier 121 and the first differential amplifier 111 may have identical topology (or structure) but the transistors in the second differential amplifier 121 are implemented with scaled-down geometric parameters relative to their counterparts in the first differential amplifier 111. Such scaling down of device geometries enables the second differential amplifier 121 to achieve improved transient response and higher input sensitivity compared to the first differential amplifier 111.

The signal coupling circuit 130 comprises a current mirror circuit 131 and a coupling capacitor 132. The current mirror circuit 131 is configured to generate an output current IB (e.g., a scaled replica current) according to an input current IA that is generated based on the second driving voltage VDRVB at the output terminal OUT_B of the second differential amplifier 121. The coupling capacitor 132 is coupled between an output terminal OUT_CM of the current mirror circuit 131 and the output terminal OUT_A of the first differential amplifier 111 (as well as the control terminal G1 of the first pass transistor M1). The coupling capacitor 132 is configured to facilitate (AC) coupling of voltage fluctuation that is induced by the output current IB of the current mirror circuit 131 to the output terminal OUT_A of the first differential amplifier 111. Consequently, the signal coupling circuit 130 effectively modulates the operation of the first LDO regulator 110 according to the second driving voltage VDRVB, thereby enhancing the transient response and overall dynamic performance of the voltage regulation device 100.

The current mirror circuit 131 is powered by the input voltage AVDD and has the output terminal OUT_CM that is coupled to the output terminal OUT_A of the first differential amplifier 111 through the coupling capacitor 132. In one embodiment, the current mirror circuit 131 could comprise (but is not limited to): a first transistor M3, a second transistor M4 and a third transistor M5. The first transistor M3 has a control terminal, a first terminal and a second terminal. The control terminal of first transistor M3 is coupled to its first terminal and the second terminal of the first transistor M3 is coupled to the ground GND. The second transistor M4 has a control terminal, a first terminal and a second terminal. The control terminal of second transistor M4 is coupled to the control terminal of the first transistor M3. The first terminal of the second transistor M4 is coupled to the output terminal OUT_CM of the current mirror circuit 131 and the second terminal of the second transistor M4 is coupled to the ground GND. The third transistor M5 has a control terminal, a first terminal and a second terminal. The control terminal of third transistor M5 is coupled to the output terminal OUT_B of the second differential amplifier 121. The second terminal of the third transistor M5 is coupled to the first terminal of the first transistor M3.

In one embodiment, the current mirror circuit 131 incorporates an enablement circuit 140, which is configured to selectively activate or deactivate the current mirror circuit 131 by controlling current paths from the input voltage AVDD to the current mirror circuit 130. The enablement circuit 140 functions as a power gating mechanism, effectively disconnecting the current mirror circuit 131 from the power supply (i.e., the input voltage AVDD) when its operation is not required. This feature allows the voltage regulation device 100 to achieve enhanced power efficiency by eliminating unnecessary static current consumption during periods when functions (e.g., coupling of the second driving voltage VDRVB to the first LDO regulator 110) provided by the current mirror circuit 131 is not needed. As such, the voltage regulation device 100 can optimize its energy utilization.

In one embodiment, the enablement circuit 140 may comprise (but is not limited to): a first switching transistor M6, a second switching transistor M7 and a third switching transistor M8. The first switching transistor M6 has a control terminal, a first terminal and a second terminal. The control terminal of the first switching transistor M6 is coupled to a first enablement signal PWR', the first terminal of the first switching transistor M6 is coupled to the input voltage AVDD and the second terminal of the first switching transistor M6 is coupled to the first terminal of the third transistor M5. The second switching transistor M7 has a control terminal, a first terminal and a second terminal. The control terminal of the second switching transistor M7 is coupled to a second enablement signal PWR (which is an inverted version of the first enablement signal PWR') and the second terminal of the second switching transistor M7 is coupled to the output terminal OUT_CM of the current mirror circuit 131. The third switching transistor M8 has a control terminal, a first terminal and a second terminal. The control terminal of the third switching transistor M8 is coupled to the first enablement signal PWR'. The first terminal of the third switching transistor M8 is coupled to the input voltage AVDD. The second terminal of the third switching transistor M8 is coupled to the first terminal of the second switching transistor M7.

In conclusion, the voltage regulation device of the present invention leverages a dual-loop LDO architecture, which ensures robust drive capability under varying load conditions and sufficient current to meet high power demands through the first LDO regulator (i.e., first loop) based on large-geometry differential amplifier, as well as ensures greater transient response and high input sensitivity through the second LDO regulator (i.e., second loop) based on small-geometry differential amplifier. The dual-loop architecture results in a voltage regulation system that combines high current drive capability with fast dynamic response, enabling the voltage regulation device to meet and exceed the stringent requirements of high-speed interfaces, making it particularly suitable for applications in mobile devices, high-speed data communication systems, and other performance-critical electronic products where rapid voltage stabilization is critical.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage regulation device, comprising:

a first low-dropout (LDO) regulator, configured to receive an input voltage of the voltage regulation device and accordingly generate and stabilize an output voltage of the voltage regulation device, comprising:

a first differential amplifier, configured to generate a first driving voltage based on a difference between the output voltage and a reference voltage;

a second LDO regulator, coupled in parallel with the first LDO regulator, configured to provide supplementary regulation to further stabilize the output voltage, comprising:

a second differential amplifier, configured to generate a second driving voltage based on the difference between the output voltage and the reference voltage, wherein a size of the second differential amplifier is smaller than that of the first differential amplifier, and geometric parameters of one or more transistors included in the second differential amplifier are smaller than those of one or more corresponding transistors included in the first differential amplifier; and a signal coupling circuit, coupled between the first LDO regulator and the second LDO regulator, configured to apply a voltage provided by second LDO regulator to the first LDO regulator, thereby modulating an operation of the first LDO regulator.

2. The voltage regulation device of claim 1, wherein the first LDO regulator further comprises:

a first pass transistor, coupled to the first differential amplifier, driven by the first driving voltage to regulate the output voltage; and wherein the second LDO regulator further comprises:

a second pass transistor, coupled to the second differential amplifier, driven by the second driving voltage to regulate the output voltage.

3. The voltage regulation device of claim 2, wherein the first differential amplifier has a first input terminal, a second input terminal and an output terminal; the first pass transistor has a control terminal, a first terminal and a second terminal; the first input terminal of the first differential amplifier is coupled to the reference voltage, the second input terminal of the first differential amplifier is coupled to the second terminal of first pass transistor and the output voltage, the output terminal of the first differential amplifier is coupled to the control terminal of the first pass transistor, and the first terminal of the first pass transistor is coupled to the input voltage.

4. The voltage regulation device of claim 2, wherein the second differential amplifier has a first input terminal, a second input terminal and an output terminal; the second pass transistor has a control terminal, a first terminal and a second terminal; the first input terminal of the second differential amplifier is coupled to the reference voltage, the second input terminal of the second differential amplifier is coupled to the second terminal of second pass transistor and the output voltage, the output terminal of the second differential amplifier is coupled to the control terminal of the second pass transistor, and the first terminal of the second pass transistor is coupled to the input voltage.

5. A voltage regulation device, comprising:

a first low-dropout (LDO) regulator, configured to receive an input voltage of the voltage regulation device and accordingly generate and stabilize an output voltage of the voltage regulation device, comprising:

a first differential amplifier, configured to generate a first driving voltage based on a difference between the output voltage and a reference voltage; and a first pass transistor, coupled to the first differential amplifier, driven by the first driving voltage to regulate the output voltage;

a second LDO regulator, coupled in parallel with the first LDO regulator, configured to provide supplementary regulation to further stabilize the output voltage, comprising:

a second differential amplifier, configured to generate a second driving voltage based on the difference between the output voltage and the reference voltage; and a second pass transistor, coupled to the second differential amplifier, driven by the second driving voltage to regulate the output voltage; and a signal coupling circuit, coupled between the first LDO regulator and the second LDO regulator, configured to apply a voltage provided by second LDO regulator to the first LDO regulator, thereby modulating an operation of the first LDO regulator, comprising:

a current mirror circuit, coupled to the input voltage and an output terminal of the second differential amplifier, configured to generate an output current according to an input current that is generated based on the second driving voltage provided by the second differential amplifier; and;

a coupling capacitor, coupled between an output terminal of the current mirror circuit and an output terminal of the first differential amplifier, configured to facilitate coupling of voltage fluctuation that is induced by the output current of the current mirror circuit to the output terminal of the first differential amplifier.

6. The voltage regulation device of claim 5, wherein the current mirror circuit comprises:

a first transistor having a control terminal, a first terminal and a second terminal, wherein the control terminal of first transistor is coupled to the first terminal of the first transistor;

a second transistor having a control terminal, a first terminal and a second terminal, wherein the control terminal of second transistor is coupled to the control terminal of the first transistor, and the first terminal of the second transistor is coupled to the output terminal of the current mirror circuit; and a third transistor, having a control terminal, a first terminal and a second terminal, wherein the control terminal of third transistor is coupled to the output terminal of the second differential amplifier and the second terminal of the third transistor is coupled to the first terminal of the first transistor.

7. The voltage regulation device of claim 6, wherein the current mirror circuit comprises:

an enablement circuit coupled to the first, second and third transistors, configured to selectively activate or deactivate the current mirror circuit according to at least one enablement signal.

8. The voltage regulation device of claim 7, wherein the enablement circuit comprises:

a first switching transistor having a control terminal, a first terminal and a second terminal, wherein the control terminal of the first switching transistor is coupled to a first enablement signal, the first terminal of the first switching transistor is coupled to the input voltage and the second terminal of the first switching transistor is coupled to the first terminal of the third transistor;

a second switching transistor having a control terminal, a first terminal and a second terminal, wherein the control terminal of the second switching transistor is coupled to a second enablement signal and the second terminal of the second switching transistor is coupled to the output terminal of the current mirror circuit, wherein the second enablement signal is an inverted version of the first enablement signal; and a third switching transistor having a control terminal, a first terminal and a second terminal, wherein the control terminal of the third switching transistor is coupled to the first enablement signal, the first terminal of the third switching transistor is coupled to the input voltage and the second terminal of the third switching transistor is coupled to the first terminal of the second switching transistor.

* * * * *